Feb. 16, 1932.  E. E. GREGORY  1,845,998

THERMOSTAT

Original Filed Oct. 27, 1925

INVENTOR
ELI E. GREGORY

BY
*Mason, Fenwick + Lawrence*
ATTORNEYS

Patented Feb. 16, 1932

1,845,998

UNITED STATES PATENT OFFICE

ELI E. GREGORY, OF BROOKLYN, NEW YORK, ASSIGNOR TO SPENCER THERMOSTAT COMPANY, A CORPORATION OF MASSACHUSETTS

THERMOSTAT

Original application filed October 27, 1925, Serial No. 65,218. Divided and this application filed February 13, 1926. Serial No. 88,095.

This invention relates broadly to thermostats, and is a division of the application filed by me October 27, 1925, Serial Number 65,218, which shows an application of the invention to an electric circuit controller.

One application of the thermostat comprising my invention is illustrated in my Patent No. 1,576,649, granted March 16, 1926, in connection with the movable hand, index or feature of an advertising device, to reciprocate said feature abruptly or with a jump motion as the temperature of the thermostatic element changes.

My invention consists primarily of a flexible strip, sheet, plate, or piece of thermostatic material which is held flexed in one direction by a yielding or elastic pressure in such a manner that when the temperature of the thermostat rises, the greater expansion of its component material opposite said direction when sufficient will cause the thermostatic piece to overcome the elastic pressure thereon and to snap or spring abruptly past the center of pressure to a flexure in the opposite direction, and when the temperature of the thermostat falls, the thermostatic piece will conversely spring abruptly past the center of pressure to its original position.

My invention comprises also an electric heating resistant applied to the thermostatic piece so as to cause the same to move abruptly as stated.

My invention also consists of means for adjustably limiting the abrupt movement of the thermostatic piece so as to regulate its action.

My invention also consists of means for adjusting the elastic pressure by which the thermostatic piece is held flexed, so as to regulate its action.

My invention also comprises various other features of construction and arrangement hereinafter described and claimed.

In order that my invention may be fully understood, I shall at first describe in detail the mode in which I at present prefer to carry the invention into practice, and then point out the various features of the invention in the claims.

Reference is to be had to the accompanying drawings forming part of this specification in which like parts are designated by the same numerals in all the figures.

Figure 1:
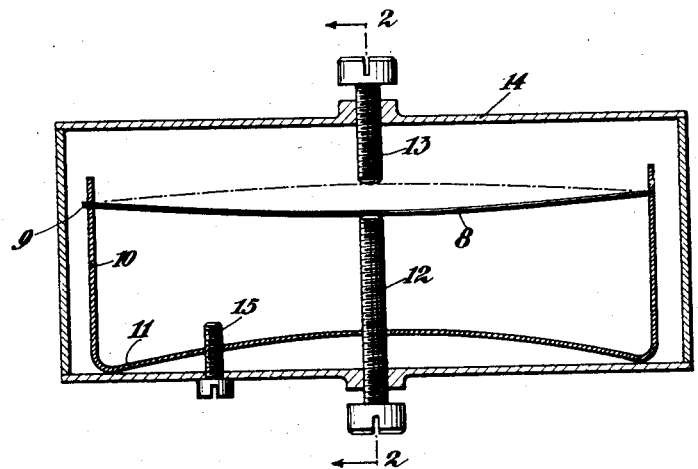
Figure 1 is a side view of a thermostat embodying the present preferred form of my invention.

In the present embodiment of my invention, numeral 8 designates a flexible strip, sheet, plate, or other piece of thermostatic material. I prefer to hold this flexible thermostatic strip 8 flexed under elastic pressure, as for example indicated in solid lines in Figures 1 and 2 by inserting or otherwise pivotally securing the ends of strip 8 in seats 9 in the opposite flexible arms 10 of flexible strip 11.

Figure 2:
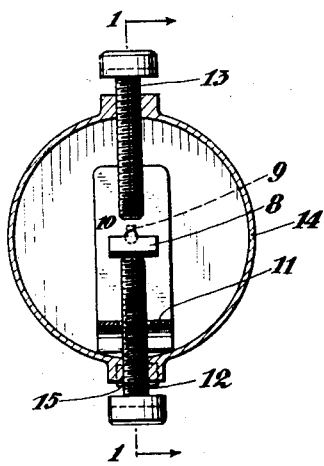
Figure 2 is a vertical section taken along line 2—2, Figure 1.

With the strip 8 flexed as shown in solid lines in Figs. 1 and 2, the more expansive component material of the thermostatic strip 8 is on the side of said strip opposite the direction toward which the strip is flexed. When the strip is in this position, it is to be understood that it is at its cooler temperature, so that when the thermostatic strip is heated in any manner sufficiently to expand the more expansive component and overcome the elastic inward pressure of the arms 10 of strip 11, the thermostatic piece or strip 8 will snap or spring abruptly past the axis of pressure into the position indicated in dotted lines in Figure 1.

Conversely, when the temperature of the thermostatic piece 8 falls sufficiently to contract the more expansive component material so as to overcome the elastic inward pressure of the arms 10, the thermostatic strip 8 will snap or spring abruptly in the opposite direction past the axis of pressure to the position shown in full lines in Figure 1.

To regulate the action of the thermostatic strip or piece 8, and limit its jump in either direction, I prefer to employ stops 12 and 13 adjustably mounted in a case or other fixture 14 on opposite sides of the strip 8. In this instance, the stops are shown as threaded, and by screwing the stops 12 and 13 in the fixture 14, the movement of the strip 8 can be stopped at the exact point from which it will jump abruptly when the predetermined temperature is reached.

To adjust, regulate, and control further the action of the thermostatic piece or strip 8, I have shown an adjusting screw 15, passing through a suitable non-threaded hole in the case 14 and threadedly engaging the strip 11. Thus by turning screw 15, I can easily flex the strip 11 to increase or decrease the elastic axial pressure of the arms 10 on the flexible strip 8.

It is to be understood that I do not limit myself to these specific means for controlling and regulating the action of piece or strip 8, as either one or both of these regulating means may be employed, and they may take various other forms without departing from the scope of the invention.

It is evident that my improved and novel thermostat may be used in innumerable ways, as for instance, it may be used as a motor wherever such an abrupt motion is desired. Also, when the thermostatic strip 8 is properly connected to an electric circuit controller, it is evident that arcing or chattering due to the making and breaking of the circuit will be avoided by the abrupt movements of the strip.

It will be understood also that the strip 8 may be heated in various manners, for example, an electric heating resistant may be wound around or applied to said thermostatic strip to cause the same to move abruptly. Again, the thermostatic strip may rely for its heat upon the heat of an implement to which it is attached, and also upon the temperature of the room in which it is situated.

It is evident that many changes may be made in the specific construction and arrangement described without departing from the boundaries of my invention as defined by the following claims:—

I claim as my invention:—

1. A thermostat comprising a flexible piece of thermostatic material and bearings pressing oppositely on said thermostatic piece, at least one of said bearings being pivotal and elastic, acting to flex the thermostatic piece and to yield and cause it to jump to its oppositely flexed position when a change of temperature causes it to move across the axis of pressure.

2. A thermostat comprising a flexible piece of thermostatic material, and opposing bearings at least one of which is an elastic arm pivoted to and acting to flex the thermostatic piece and to yield and cause it to jump to its oppositely flexed position when a change of temperature causes it to move across the axis of pressure.

3. A thermostat comprising a flexible piece of thermostatic material and an elastic flexing element therefor comprising opposing arms connected by an elastic piece acting to flex the thermostatic piece and to yield and cause it to jump to its oppositely flexed position when a change of temperature causes it to move across the axis of pressure.

4. A snap acting thermo-responsive controlling device comprising a frame having resilient supports and a connecting member, a bimetallic member held by said supports, and means operative upon the connecting member for regulating the pressure of said supports.

5. A snap acting thermo-responsive controlling device comprising a pair of spaced supports, a stressed and curved bimetallic member separate from said supports and held between the same, and adjustable resilient pressure means for causing said bimetallic member to assume a reversal of curvature under a temperature change.

6. A thermo-responsive controlling device comprising a frame having a pair of elastic pressure-exerting arms, a flexed bimetallic member mounted between said arms, the ends of said bimetallic member being pivoted with respect to said arms and means for adjusting the pressure of said arms to cause the bimetallic member to snap into a position of opposite curvature under a temperature change.

7. A thermo-responsive controlling device having a frame provided with a pair of resilient arms and a resilient connecting member therefor, a bimetallic strip held between said arms and means operative upon the resilient connecting member for regulating the pressure of said arms.

8. A thermostat comprising a U-shaped spring, a bimetallic strip, means including a slotted portion in the end of one arm of said spring for maintaining said strip under compression, said means preventing said strip from assuming its normal free shape whereby heat strains cause said strip to snap from one position to another.

9. A thermostat comprising a U-shaped spring, at least one arm of said spring being slotted, a bimetallic strip, one end of said strip having a knife edge, means for mounting said strip so that the knife edge of said strip lies in the slot of the spring, said strip being compressed by said spring to prevent the strip from ever assuming its normally free shape whereby said strip snaps from one position to another position in response to heat strains.

10. A thermostat comprising a base, a U-shaped spring, a bimetallic strip, a knife edge connection between one end of said strip and one arm of said spring, said strip being mounted so that the spring exerts a compressive force on the strip preventing it from ever assuming its normally free shape, and means for adjusting the flexure of the spring arms to change the curvature of the strip whereby the strip snaps from one position to another in response to heat strains at predetermined temperatures.

11. The thermostat of claim 10 wherein said flexure adjusting means comprises a screw connecting said base and spring.

In testimony whereof I affix my signature.

ELI E. GREGORY.